United States Patent

Fuhr

[15] 3,646,552

[45] Feb. 29, 1972

[54] TAMPERPROOF RESISTANCE-SENSING SUPERVISORY SYSTEM

[72] Inventor: David R. Fuhr, Kokomo, Ind.

[73] Assignee: General Motors Corporation, Detroit, Mich.

[22] Filed: Nov. 10, 1970

[21] Appl. No.: 88,458

[52] U.S. Cl. ....340/409, 340/412

[51] Int. Cl. ....G08b 29/00

[58] Field of Search ....340/409

[56] References Cited

UNITED STATES PATENTS 3,540,042 10/1970 Morrow ....340/409

*Primary Examiner*—Thomas B. Habecker

*Attorney*—E. W. Christen, C. R. Meland and Tim G. Jagodzinski

[57] ABSTRACT

A supervisory system is provided for monitoring a plurality of remote stations from a central station. A supervisory circuit located at each of the remote stations is connected to a corresponding monitoring circuit located at the central station through a pair of conductors. The supervisory circuits each include a switching device operable between an opened position and a closed position. A control circuit located at the central station and connected to each of the monitoring circuits detects closed-switch, opened-switch, ground, short circuit and open circuit conditions existing in each of the supervisory circuits located at the remote stations. In addition, the control circuit detects the failure of any of the system components and the external application of an unauthorized voltage across any of the supervisory circuits.

2 Claims, 3 Drawing Figures

INVENTOR.
David R. Fuhr
BY
Tim G. Jagodzinski
ATTORNEY

TAMPERPROOF RESISTANCE-SENSING SUPERVISORY SYSTEM

DISCLOSURE

This invention relates to a supervisory system for monitoring a plurality of remote stations from a central station located away from the remote stations.

Normally, a switching device operable between opened and closed positions is located at each of the remote stations across a pair of conductors connecting the remote station to the central station. Hence, there are ordinarily five conditions of interest which may occur at each of the remote stations. First, the switching device may be in the closed position. Second, the switching device may be in the opened position. Third, one of the conductors may be grounded. Fourth, one of the conductors may be open circuited. Fifth, the conductors may be short circuited together.

A supervisory system for monitoring all five of the conditions of interest is disclosed in U.S. Pat. application Ser. No. 829,462. This prior supervisory system includes a plurality of supervisory circuits each located at a different one of the remote stations and each connected to a different one of a plurality of monitoring circuits located at the central station through a different one of a plurality of pairs of conductors. The supervisory circuits each include a first sensing resistance connected in series with a switching device and a second sensing resistance connected in parallel with the switching device. The monitoring circuits each include a voltage divider network having at least two detecting resistances connected in series. The supervisory circuits are each connected across one of the detecting resistances of the associated one of the monitoring circuits thereby to establish a signal voltage across the other of the detecting resistances. The signal voltage assumes a different corresponding level depending upon which of the five conditions of interest exists in the associated one of the supervisory circuits located at the remote stations.

Although the prior supervisory system is highly satisfactory, it is not completely tamperproof. Ordinarily, either the opened or closed position of the switching device represents the normal condition of the supervisory circuit. In the normal condition, a predetermined voltage is defined across the supervisory circuit. Consequently, if an unauthorized voltage matching this predetermined voltage is applied between the pair of conductors connecting the supervisory circuit to the monitoring circuit, the supervisory circuit is effectively disabled without effecting the monitoring circuit. That is, the subsequent operation of the switching device in the supervisory circuit is undetected by the monitoring circuit. The present invention proposes a supervisory system which remedies this problem.

According to the present invention, the level of the signal voltage is responsive to the application of an unauthorized voltage across the pair of conductors connecting the supervisory circuit with the monitoring circuit. In general, this is accomplished by selectively connecting the detecting resistances of the monitoring circuit to either a source of supply potential or a source of reference potential. When the supply potential is applied to the monitoring circuit, the level of the signal voltage is responsive to the condition of the supervisory circuit as previously described. However, when the reference potential is applied to the monitoring circuit, the level of the signal voltage is responsive to the application of an unauthorized voltage to the supervisory circuit.

These and other aspects and advantages of the invention will become more apparent by reference to the following detailed description of a preferred embodiment when considered in conjunction with the accompanying drawing, in which.

Figure 1:
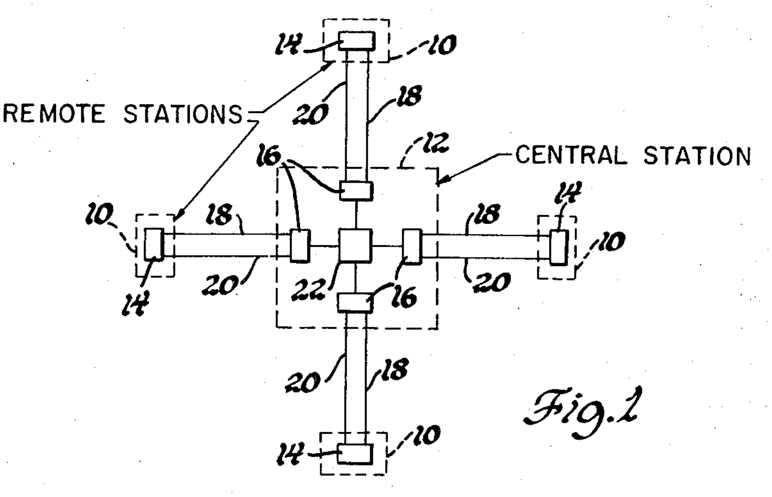
FIG. 1 is a block diagram of a supervisory system incorporating the principles of the invention.

FIG. 1 discloses a supervisory system for monitoring a plurality of remote stations 10 from a central station 12 located away from the remote stations 10. A plurality of supervisory circuits 14 are each located at a different one of the remote stations 10. A plurality of monitoring circuits 16 are each located at the central station 12. A plurality of pairs of conductors 18 and 20 each connect a different one of the supervisory circuits 14 with a different associated one of the monitoring circuits 16. A control circuit 22 is located at the central station 12 and is connected to each of the monitoring circuits 16. The control circuit 22 successively senses and records the condition of each of the supervisory circuits 14 as detected by the associated one of the monitoring circuits 16. Obviously, the illustrated supervisory system may employ as many supervisory circuits 14 and monitoring circuits 16 as there are remote stations 10 to be monitored.

Figure 2:
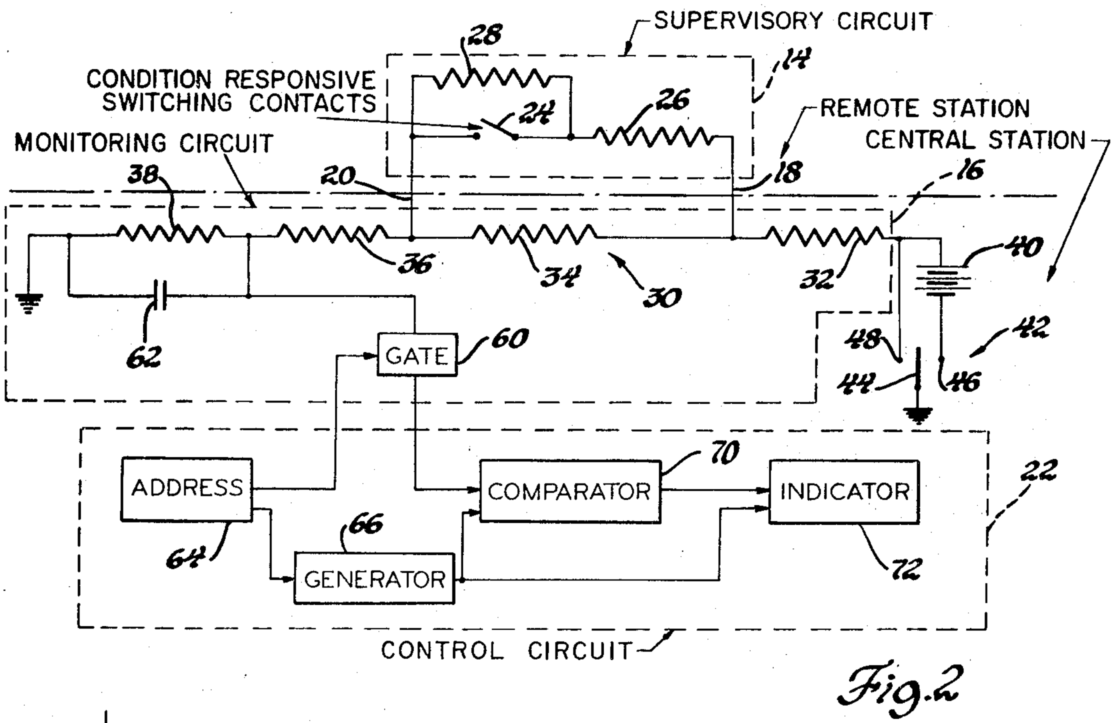
FIG. 2 is a schematic diagram of a portion of the supervisory system illustrated in FIG. 1.

FIG. 2 discloses a portion of the supervisory system illustrated in FIG. 1 including a supervisory circuit 14 connected to a monitoring circuit 16 by a pair of conductors 18 and 20. The supervisory circuit 14 includes a pair of switching contacts 24 operable between an opened and a closed position in response to some supervised event. The supervised event may be any phenomena capable of being represented by the relative position of the switching contacts 24. As an example, the switching contacts 24 may be automatically operated by a fire detection device or manually operated by security personnel on normal patrol duty.

The supervisory circuit 14 further includes a first sensing resistor 26 connected in series with the switching contacts 24 and a second sensing resistor 28 connected in parallel with the switching contacts 24. Accordingly, the resistance presented between the conductors 18 and 20, across the supervisory circuit 14, varies depending upon the position of the switching contacts 24. Hence, one value of resistance is presented when the switching contacts are in the opened position in which the resistor 28 is effectively connected in series with the resistor 26. Conversely, a different value of resistance is presented when the switching contacts are in the closed position in which the resistor 28 is effectively shunted.

The monitoring circuit 16 includes a voltage divider network 30 provided by first, second, third and fourth detecting resistors 32, 34, 36 and 38 connected in series between a suitable voltage source 40 and ground through a voltage control switch 42. The switch 42 includes a pivotable arm 44 cooperating with a pair of contacts 46 and 48. The arm 44 is connected to ground. The contact 46 is connected to the negative terminal of the voltage source 40. The contact 48 is connected between the positive terminal of the voltage source 40 and the first detecting resistor 32. The voltage control switch 42 is operable between a first position in which the arm 44 engages the contact 46 and a second position in which the arm 44 engages the contact 48. When the switch 42 is in the first position, the voltage divider network 30 is effectively connected to the voltage source 40 or source of supply potential. When the switch 42 is in the second position, the voltage divider network 30 is effectively connected to ground or a source of reference potential. The voltage source 40 may be conveniently provided by a conventional battery. The voltage control switch 42 may be a manually operable mechanical switch, such as a single-throw double-pole switch, or it may be an automatically operable electronic switch, such as a bistable multivibrator.

The conductors 18 and 20 connect the supervisory circuit 14 across the second detecting resistor 34 thereby to establish a signal voltage across the fourth detecting resistor 38. Assuming the voltage control switch 42 is in the first position so as to apply a supply potential to the voltage divider network 30, the effective resistance appearing across the second detecting resistor 34 is directly related to the resistance presented by the supervisory circuit 14 between the conductors 18 and 20. Further, the signal voltage appearing across the fourth detecting resistor 38 is an inverse function of the effective resistance appearing across the second detecting resistor 34. Therefore, the signal voltage appearing across the fourth detecting resistor 38 is responsive to the condition of the supervisory circuit 14.

Figure 3:
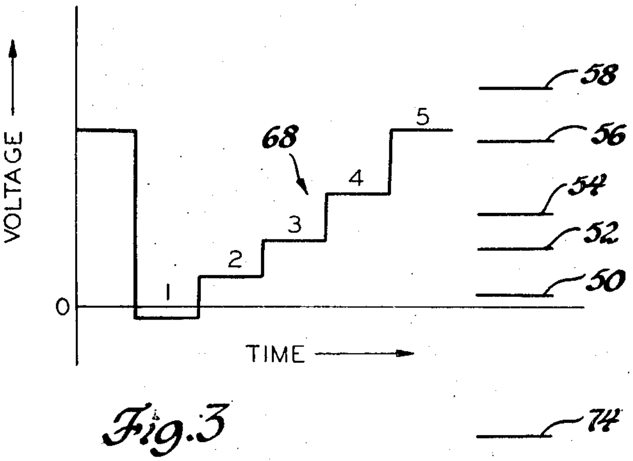
FIG. 3 is a graph of a series of voltage levels useful in explaining the principles of the invention.

FIG. 3 illustrates the relative levels of the signal voltage developed across the fourth detecting resistor 38 for each of the five conditions of interest which may exist in the supervisory circuit 14. The signal voltage is at a first level 50 when one of the conductors 18 and 20 is grounded. The signal voltage is at a second higher level 52 when one of the conductors 18 and 20 is open circuited. The signal voltage is at a third higher level 54 when the switching contacts 24 are in the opened position. The signal voltage is at a fourth higher level 56 when the switching contacts 24 are in the closed position. Finally, the signal voltage is at a fifth higher level 58 when the conductors 18 and 20 are short circuited together. The first level 50 is slightly higher than ground due to the small amount of voltage drop provided by the conductors 18 and 20 even when grounded.

Referring again to FIG. 2, the monitoring circuit 16 also includes a gate 60 which is connected between the third and fourth detecting resistors 36 and 38 to receive the signal voltage. A capacitor 62 is connected across the fourth detecting resistor 38 to provide an RC filter. The capacitor 62 shunts high-frequency noise to ground around the fourth detecting resistor 38 thereby to prohibit the noise from influencing the level of the signal voltage established across the resistor 38. The first detecting resistor 32 provides a resistance for the voltage source 40 if the conductor 18 is grounded. The third detecting resistor 36 restricts the level of the signal voltage to a range suitable for utilization by the control circuit 22.

The control circuit 22 includes an address device 64 connected to the gate 60 and to a voltage generator 66. Simultaneously, the address device 64 activates the gate 60 to apply the signal voltage from the monitoring circuit 16 to the control circuit 22, and energizes the voltage generator 66 to initiate a staircase reference voltage 68 as shown in FIG. 3. The reference voltage 68 includes successively higher voltage levels one through five. A comparator 70 is connected to the gate 60 to receive the signal voltage and is connected to the voltage generator 66 to receive the reference voltage 68. The comparator 70 produces an output signal when the level of the reference voltage 68 exceeds the level of the signal voltage which may be any of the levels 50 through 58 depending upon the condition of the supervisory circuit 14. An indicator device 72 is connected to the comparator 70 to receive the output signal and is connected to the voltage generator 66 to receive the reference voltage 68. The indicator device 72 senses and records the level of the reference signal 68 when an output signal is received from the voltage comparator 70.

It will be appreciated that the level of the reference voltage 68 sensed by the indicator device 72 represents the condition of the supervisory circuit 14. For example, if the switching contacts 24 in the supervisory circuit 14 are in the opened position, the signal voltage defined by the fourth detecting resistor 38 in the monitoring circuit 16 is at the level 54. Thus, the comparator 70 produces an output signal when the reference voltage 68 reaches the level four which is greater than the level 54 of the signal voltage. Hence, the indicator device 72 senses and records the level four of the reference voltage 68 in response to the occurrence of the output signal from the comparator 70 thereby indicating that the switching contacts 24 in the supervisory circuit 14 are in the opened position. It is to be noted that the reference voltage 68 need not be a staircase voltage but may be any suitable voltage having a unidirectionally varying level, such as a ramp voltage.

In a supervisory system having a plurality of supervisory circuits 14 and associated monitoring circuits 16, the address device 64 is connected to the gates 60 in each of the monitoring circuits 16. The address device 64 sequentially activates the gates 60 in each of the monitoring circuits 16. Thus, the indicator device 72 senses and records the condition of each of the supervisory circuits 14 as the gates 60 in the associated monitoring circuits 16 are activated by the address device 64.

Although the previously described supervisory system is highly satisfactory, it is not completely tamperproof. Ordinarily, either the open or closed position of the switching contacts 24 is the normal condition of the supervisory circuit 14. When the supervisory circuit 14 is in the normal condition, a predetermined voltage is developed between the conductors 18 and 20 across the second detecting resistor 34 in the monitoring circuit 16. Under the influence of this predetermined voltage, the potential of the conductor 18 is higher than the potential of the conductor 20. In other words, the conductor 18 is positive with respect to the conductor 20. As previously described, the conductors 18 and 20 connect the supervisory circuit 14 located at the remote station 10 to the monitoring circuit 16 located at the central station 12. Therefore, it is possible to externally apply an unauthorized voltage across the supervisory circuit 14 between the conductors 18 and 20. If the magnitude of the unauthorized voltage equals the magnitude of the predetermined voltage, the supervisory circuit 14 is effectively disabled. That is, operation of the switching contacts 24 in the supervisory circuits 14 is undetected at the monitoring circuit 16.

In order to detect the application of an unauthorized voltage across the supervisory circuit 14, the voltage control switch 42 is placed in the second condition thereby effectively connecting the voltage divider network 30 to ground. When the ground or reference potential is applied to the voltage divider network 30 in the monitoring circuit 16, the level of the signal voltage developed across the fourth detecting resistor 38 is at ground in the absence of the application of an unauthorized voltage across the conductors 18 and 20. However, if an unauthorized voltage is applied across the supervisory circuit 14 between the conductors 18 and 20, the level of the signal voltage is not at ground. Since the conductor 20 is negative with respect to the conductor 18, the signal voltage assumes a level 74 below ground when an unauthorized voltage is applied between the conductors 18 and 20. Assuming the opened position of the switching contacts 24 is the normal condition of the supervisory circuit 14, the level 74 of the signal voltage is below ground when the voltage control switch 42 is in the second position to the same extent that the level 54 of the signal voltage is above ground when the voltage control switch 42 is in the first position.

The level one of the reference voltage 68 is slightly below ground. Accordingly, when an unauthorized voltage is not applied between the conductors 18 and 20, the indicator device 72 produces a response indicating that one of the conductors 18 and 20 is grounded. This indication is expected since the voltage control switch 42 is in the second position. Conversely, when an unauthorized voltage is applied across the conductors 18 and 20 an output signal from the comparator 70 is continuously present since the level one of the reference voltage 68 never falls below the level 74 of the signal voltage. This indicates the presence of an unauthorized voltage.

If any of the system components of the supervisory circuit 14, the monitoring circuit 16 or the control circuit 22 should fail, the comparator 70 will necessarily either continuously produce an output signal or continuously not produce an output signal. Accordingly, the indicator device 72 will interpret the performance of the comparator 70 as indicative of either the grounding of one of the conductors 18 and 20 or the application of an unauthorized voltage between the conductors 18 and 20. Thus, the indicator device 72 yields a fault indication in response to the failure of any of the system components. Therefore, the illustrated supervisory system is essentially fail-safe.

In a supervisory system constructed in accordance with the preferred embodiment of the invention illustrated in FIG. 2, the following circuit components were found to yield satisfactory results:

Resistor 26—15K ohms
Resistor 28—6.2K ohms
Resistor 32—820 ohms
Resistor 34—27K ohms
Resistor 36—4.3K ohms Resistor 38—1.5K ohms Capacitor 62—1.0 microfarads Voltage source 40—20 volts It is to be understood that the preferred embodiment of the invention disclosed herein is shown for illustrative purposes only and that various alterations and modifications may be made thereto without departing from the spirit and scope of the invention. Thus, the illustrated control circuit 22 may take any of a variety of configurations well known to those skilled in the art. Ordinarily, the exact configuration of the control circuit 22 will be determined by the precise requirements of each particular application.

In the illustrated control circuit 22, the gates 60 and the address device 64 may be provided by suitable logic elements well known to those skilled in the art. The voltage generator 66 may be provided by any conventional staircase voltage generator, such as a ladder network coupled with a bank of sequentially operated switches. The comparator 70 may conveniently take the form of a conventional differential amplifier. The indicator device 72 may be provided by any suitable circuit capable of indicating the level of the reference voltage 68 at the time an output signal is received from the comparator 70.

More specifically, the indicator device 72 may include a plurality of flip-flops each connected in series between a control gate and a different related one of a series of indicator lamps. The indicator lamps may be energized when related ones of the flip-flops are in the set state. The control gate may be connected to the generator 66 for applying the reference voltage 68 to the flip-flops and may be connected to the comparator 70 for interrupting the application of the reference voltage 68 to the flip-flops in response to an output signal from the comparator 70. A voltage divider network may be connected across the input of each of the flip-flops so as to cause a different one of the flip-flops to switch to the set state in response to each different level of the reference voltage 68 thereby to energize the related one of the indicator lamps. Thus, when the control gate interrupts the application of the reference voltage 68 to the flip-flops, the illuminated ones of the lamps yield an indication of the level of the reference voltage 68 thereby indicating the condition of the corresponding one of the supervisory circuits 14. The flip-flops may be each connected to the address device 64 so as to be reset by each succeeding address signal.

What is claimed is:

1. A supervisory system for monitoring a plurality of remote stations from a central station located away from the remote stations, comprising: a plurality of supervisory circuits each located at a different one of the remote stations, the supervisory circuits each including a switching device operable between an opened position and a closed position, a first sensing resistance connected in series with the switching device, and a second sensing resistance connected in parallel with the switching device; a plurality of monitoring circuits each located at the central station, the monitoring circuits each including at least two detecting resistances connected in series, and voltage control means selectively operable between a first position in which a supply potential is applied to the detecting resistances and a second position in which a reference potential is applied to the detecting resistances; a plurality of different pairs of conductors each connecting a different one of the supervisory circuits across one of the detecting resistances of a different associated one of the monitoring circuits thereby to establish a signal voltage across the other end of the detecting resistances, the level of the signal voltage responsive to the condition of the supervisory circuit when the voltage control means is in the first position and responsive to the application of an unauthorized voltage across the supervisory circuit when the voltage control means is in the second position; and a control circuit located at the central station and connected to each of the monitoring circuits for determining the level of the signal voltage provided by each of the monitoring circuits when the voltage control means is in the first position thereby to indicate the condition of the associated one of the supervisory circuits and for determining the level of the signal voltage provided by each of the monitoring circuits when the voltage control means is in the second position thereby to indicate the application of an unauthorized voltage across the associated one of the supervisory circuits.

2. A supervisory system for monitoring a plurality of remote stations from a central station located away from the remote stations, comprising: a plurality of supervisory circuits each located at a different one of the remote stations, the supervisory circuits each including a switching device operable between an opened position and a closed position, a first sensing resistor connected in series with the switching device and a second sensing resistor connected in parallel with the switching device; a plurality of monitoring circuits each located at the central station, the monitoring circuits each including at least two detecting resistors connected in series, and a voltage control switch selectively operable between a first position in which a supply potential is applied to the detecting resistors and a second position in which a reference potential is applied to the detecting resistors; a plurality of different pairs of conductors each connecting a different one of the supervisory circuits across one of the detecting resistors of a different associated one of the monitoring circuits thereby to establish a signal voltage across the other end of the detecting resistors, the signal voltage assuming different levels on one side of the reference potential when the voltage control switch is in the first position in response to opening of the switching device, closing of the switching device, open circuiting of one of the conductors, grounding of one of the conductors, and short circuiting of the conductors, and the signal voltage assuming a level on the other side of the reference potential when the voltage control means is in the second position in response to the application of an unauthorized voltage across the supervisory circuit; and a control circuit located at the central station and connected to each of the monitoring circuits for determining the level of the signal voltage provided by each of the monitoring circuits when the voltage control switch is in a first position thereby to indicate the condition of the associated one of the supervisory circuits and for determining the level of the signal voltage provided by each of the monitoring circuits when the voltage control switch is in the second position thereby to indicate the application of an unauthorized voltage across the associated one of the supervisory circuits.

* * * * *

PO-1050
(5/69)

UNITED STATES PATENT OFFICE
CERTIFICATE OF CORRECTION

Patent No. 3,646,552 Dated February 29, 1972

Inventor(s) David R. Fuhr

It is certified that error appears in the above-identified patent and that said Letters Patent are hereby corrected as shown below:

Column 4, line 20, "circuits" should be -- circuit --. Column 6, line 5, "end" should be -- one --; line 39, "end" should be -- one --.

Signed and sealed this 11th day of July 1972.

(SEAL)
Attest:

EDWARD M.FLETCHER,JR.
Attesting Officer

ROBERT GOTTSCHALK
Commissioner of Patents